United States Patent [19]

Fox

[11] 4,250,968
[45] Feb. 17, 1981

[54] MINIMUM WRAP BI-ROTATIONAL CUTTER WHEEL FOR A TILLAGE IMPLEMENT

[75] Inventor: Robert E. Fox, Minburn, Iowa

[73] Assignee: Deere & Company, Moline, Ill.

[21] Appl. No.: 970,539

[22] Filed: Dec. 18, 1978

[51] Int. Cl.³ .................... A01B 33/02; A01B 49/06
[52] U.S. Cl. .................................... 172/60; 172/555
[58] Field of Search ............. 172/548, 555, 540, 21, 172/60, 120, 123, 510, 604, 15, 16, 118, 166, 572, 551; 56/255, 256, 295

[56] References Cited

U.S. PATENT DOCUMENTS

| | | | |
|---|---|---|---|
| 409,818 | 8/1889 | Bell | 172/555 |
| 530,054 | 11/1894 | Packer | 172/555 X |
| 1,075,493 | 10/1913 | Phillips | 172/120 X |
| 1,554,202 | 9/1925 | Diehl | 172/16 |
| 2,957,529 | 10/1960 | Kaller | 172/120 |
| 3,057,064 | 10/1962 | Bertolino | 172/15 |
| 3,404,520 | 10/1968 | Doliton | 172/16 X |
| 4,023,510 | 5/1977 | Sorlie | 172/555 |
| 4,043,281 | 8/1977 | Sorlie | 172/538 X |
| 4,043,404 | 8/1977 | Sorlie | 172/555 |
| 4,051,792 | 10/1977 | Brandt | 172/120 X |

FOREIGN PATENT DOCUMENTS 776767  6/1957  United Kingdom .................... 172/548

Primary Examiner—Richard J. Johnson

[57] ABSTRACT

An improved cutter wheel that is useful in conjunction with tilling apparatus for sod seeding purposes. The wheel has a body fashioned from sheet metal. The periphery is characterized by smooth contours which define the teeth and gullets. The wheel is devoid of hooked sections or notches as well as abrupt gullets where stringy material such as Bermuda grass could become caught or hairpin to cause wrapping. Different teeth are offset in opposite directions from the plane of the body to increase the effective cutting width. Additionally, the symmetry of the cutter wheel is such that it can be mounted for rotation in either direction.

9 Claims, 5 Drawing Figures

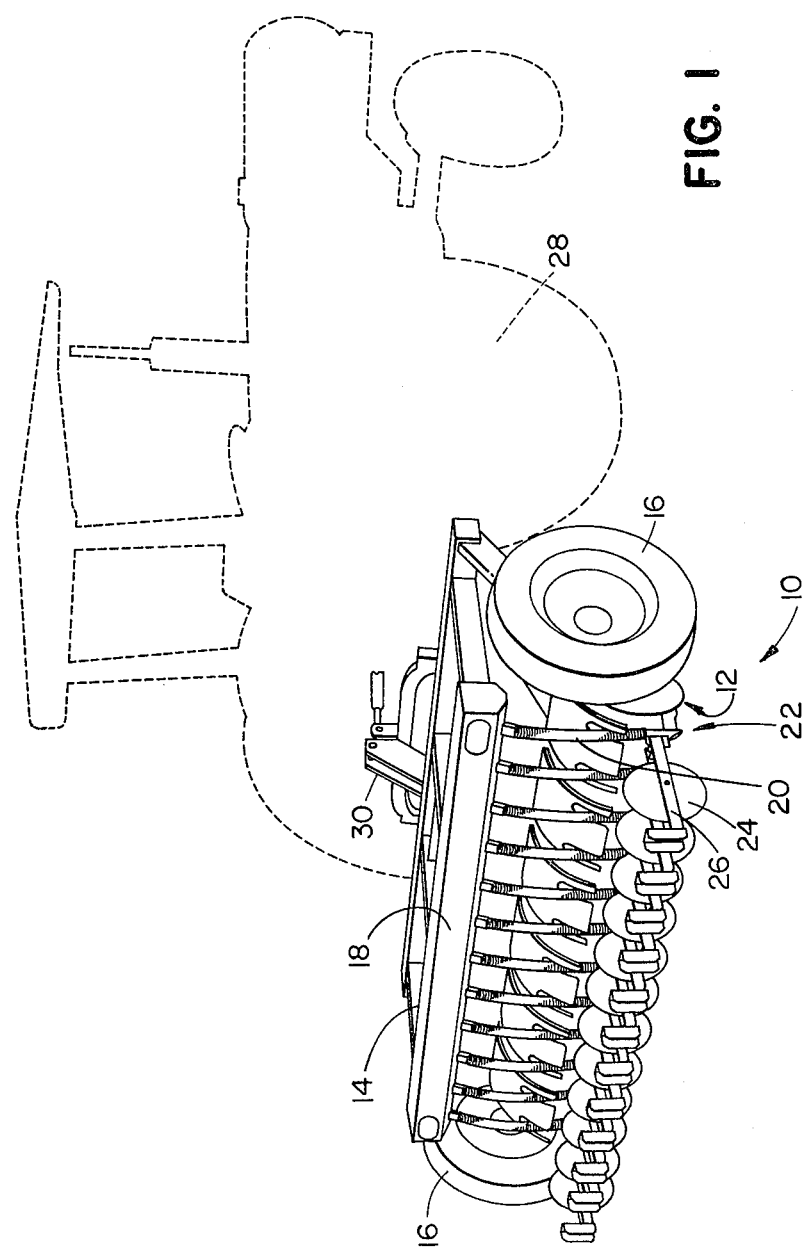

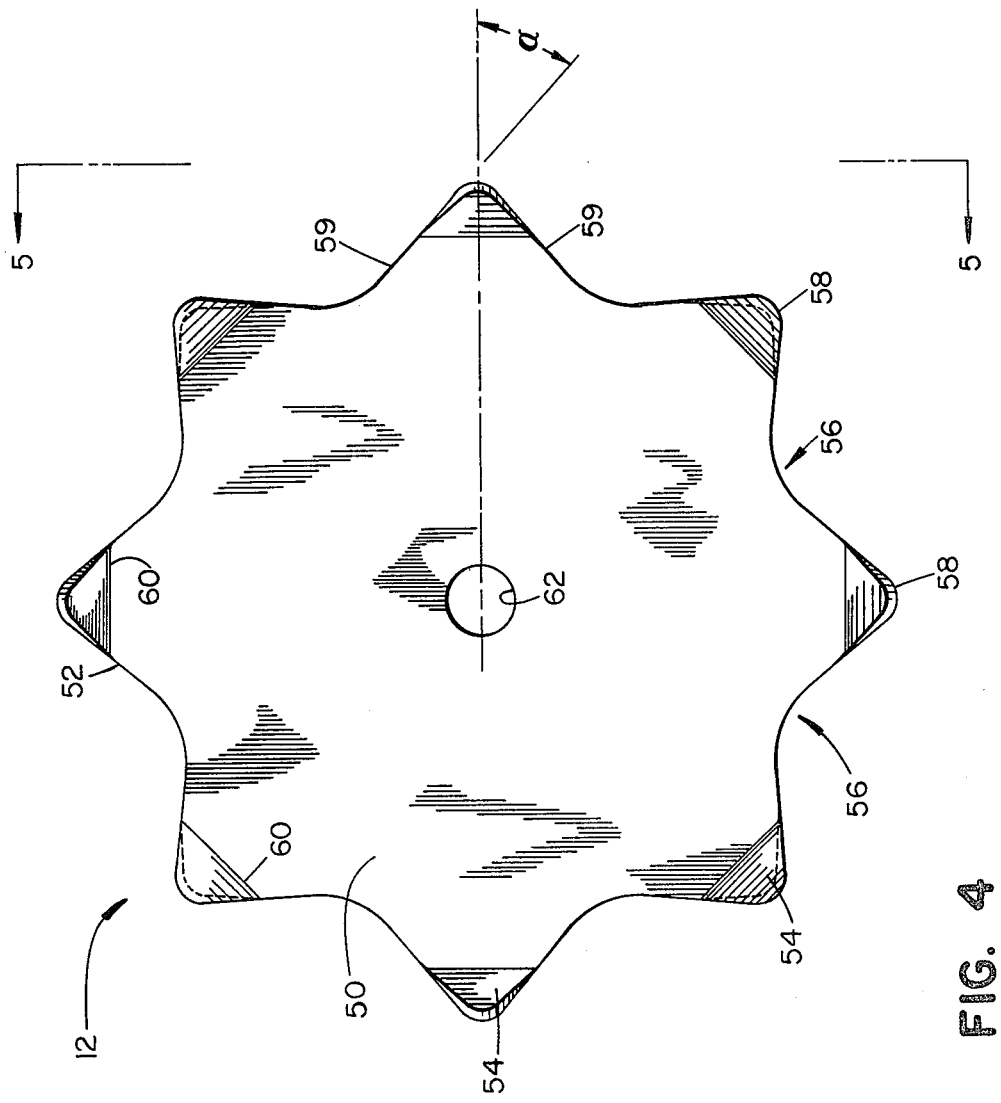

MINIMUM WRAP BI-ROTATIONAL CUTTER WHEEL FOR A TILLAGE IMPLEMENT

FIELD OF THE INVENTION

The present invention relates generally to a tillage apparatus, and more specifically to an improved cutter wheel for a tillage apparatus.

BACKGROUND OF THE INVENTION

Conventional tillage implements such as the disk harrow, disk cultivator and rotating hoe are not entirely suitable for preparing ground for seeding where established grass sod is present. In order to provide a tillage apparatus better suited for preparing ground for seeding or grassland renovation where sod is present, towed implements having a series of cutting wheels driven to open a furrow have been developed. Devices of this type are shown, for example, in U.S. Pat. Nos. 4,023,510; 4,043,281; 4,043,404 and 4,051,792. This type of tillage implement is particularly useful where legumes are to be grown in established grass sod, especially since the ground surface is often uneven or rocky and may have grass swards of differing thickness thereon. The implement is also useful for interseeding grasses such as rye and wheat into Bermuda grass.

Cutting of the sward and sod mat and provision of a furrow therein has been a continuing problem. Various types of cutter wheels, such as those disclosed in U.S. Pat. No. 4,043,404, have been devised. In areas where stringy materials, especially Bermuda grass or hay are present, wrapping of the cutter wheel can occur frequently. The materials can become caught in the teeth, in the hooked-shaped sections, or in the deep gullets of the wheel and become wrapped around the wheel and the shaft hampering the effectiveness of the tillage apparatus. The operator must then leave his tractor to remove the build-up. Untangling of the material is very time-consuming and difficult.

Typical of previous wheels which are only effective when rotated in one direction, care must be taken to correctly mount them on the drive shafts so the teeth are properly oriented with respect to the direction of rotation. A wheel is ineffective for cutting a furrow if mounted on the shaft with the teeth facing in the wrong direction.

SUMMARY OF THE INVENTION

It is therefore an object of the present invention to provide an improved cutter wheel for use with a tillage implement.

It is another object to provide an improved cutter wheel for a tillage apparatus for sod seeding purposes.

It is still another object to provide a cutter wheel which reduces the problem of wrapping in areas where stringy material such as Bermuda grass or hay is present.

It is a further object to provide a cutter wheel having a periphery characterized in that it is devoid of deep gullets, notches or hooked sections.

It is yet another object to provide a cutter wheel which can be mounted in either of two ways on a drive shaft and is equally effective for tilling the soil when rotated in either direction.

These and other objects and advantages of the present invention will become obvious from the description which follows when taken in conjunction with the accompanying drawings, in which:

FIG. 1 is a perspective view of the tillage apparatus having the improved cutter wheel mounted thereon;

FIG. 4 is a side elevation view of the preferred embodiment of the cutter wheel; and FIG. 5 is an end view of the cutter wheel shown in FIG. 4.

DESCRIPTION OF THE PREFERRED EMBODIMENT

Figure 3:
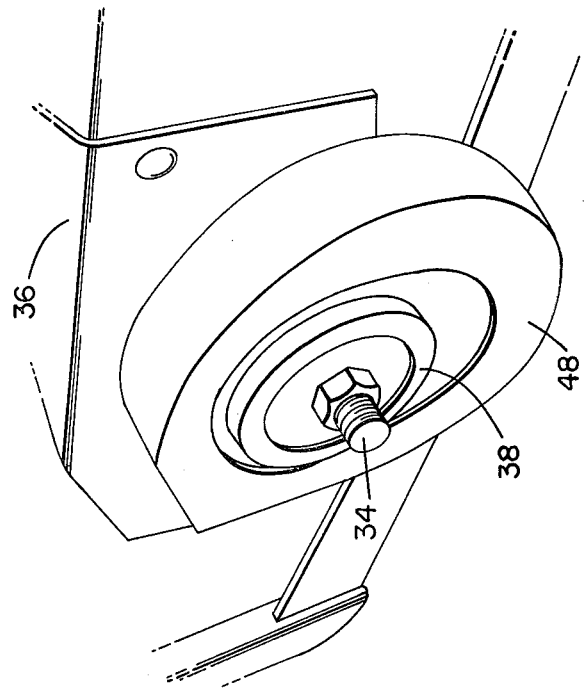
FIG. 3 is a perspective view of the drive structure for a cutter wheel showing the friction drive and threaded driveshaft upon which the cutter wheel is mounted.

As shown in FIG. 1, a tillage apparatus 10 carries the improved cutter wheel 12 of the present invention. The tillage apparatus 10 includes a frame member 14 which has gauge wheels 16 mounted thereon. Also mounted on the frame 14 is a seed box 18. Seed tubes 20 lead from seed gates below box 18 to seed boot assemblies 22. Trailing each seed boot assembly 22 is a packer wheel member 24 carried by arms 26. The apparatus 10 is connected to a tractor 28 or similar vehicle by a conventional threepoint hitch 30.

Figure 2:
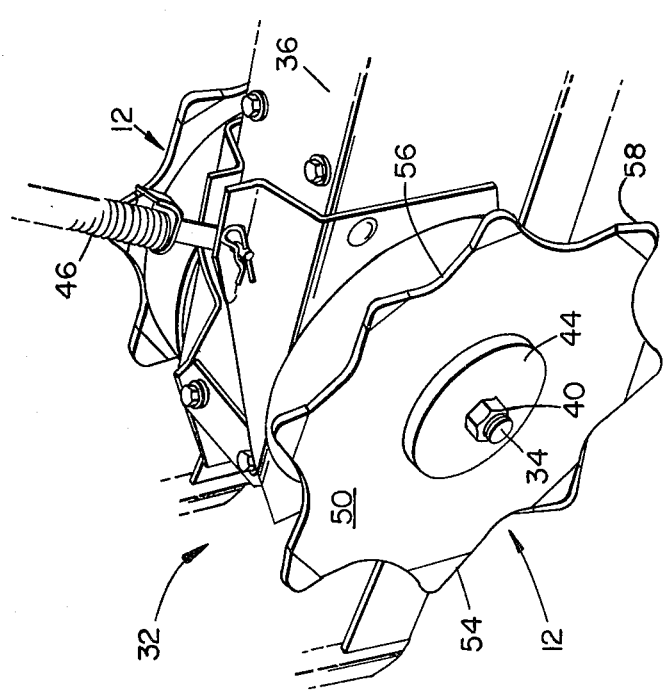
FIG. 2 is a perspective view of a portion of the tillage apparatus shown in FIG. 1 to illustrate the cutter wheel on a mounting unit.

As shown in FIG. 2, the cutter wheels 12 are mounted in a double-row configuration shown generally at 32. A drive shaft 34 is supported by a casing or frame 36 pivotally connected to a transverse rod (not shown) near the front of frame member 14. The drive shaft 34 is driven by a drive chain and sprocket located within casing 36. The chain and sprocket is powered in a conventional manner through shafts and a gear box from the tractor power take-off. A friction hub 38 (FIG. 3) is preferably mounted on the shaft 34 for rotation therewith. A nut 40 threaded on the threaded end of shaft 34 secures the cutter wheel 12 between a hub 44 and the friction hub 38 for rotation with shaft 34.

Each double row assembly 32 is biased downwardly by down pressure springs 46. Depth skids 48 maintain the cutter wheels 12 at the proper cutting depth and are adjustable up or down to set the depth for various seed and soil conditions.

A more detailed discussion of the foregoing structure and a general description of operation of the implement may be found, for example, in U.S. Pat. Nos. 4,043,404, 4,043,281, and 4,023,510, as well as in the patents mentioned therein. An alternate skid arrangement is shown in U.S. Pat. No. 4,051,792. However, the structure is utilized merely to orient the cutter wheel of this invention with respect to a tillage apparatus.

The cutter wheel 12 includes a relatively thin disk-like sheet metal body portion 50 with periphery 52. A plurality of cutting teeth 54 are defined by the periphery and in the preferred embodiment are angularly spaced 45° apart. The periphery is gently curved inwardly at locations spaced between the teeth 54 to form shallow gullets 56. The periphery extends radially outwardly an equal distance on both sides of each gullet 56 with a change in the direction of curvature smoothly occurring near the tip 58 of each tooth 54. In the preferred embodiment, as shown in FIG. 4, a line extending tangentially from an essentially straight, gently sloped section 59 of the periphery between the tip 58 and the gullet 56 intersects a line Rt radially extending from the center of disk 40 through the tip, at an angle α. The contour of the periphery 52 is substantially the same on opposite sides of the tip 58 for each toothed section. With the above configuration, the periphery is devoid of notches, hooks, or deep gullets that could catch and trap long grasses or the like thereon. The slope of the straight section 59 is such that stringy material is able to slide off the cutter tooth to prevent hairpinning and wrapping which would occur if the slope was too great. The symmetry of the wheel allows it to be mounted for rotation in either direction without affecting its furrow cutting and non-wrapping characteristics.

Each tooth 54 has a rounded tip 58, which, in the preferred embodiment, is hard-faced by heating the tip and melting a tungsten carbide material such as Stellite thereon. The tips are hard-faced on both edges as well as both sides, to significantly increase the lifetime of the cutter wheel.

In addition, as best seen in FIG. 5, each tooth 54 is offset from the plane of the disk-like body portion 50 to increase the effective cutting width of the wheel. By bending at locations 60 the teeth are angled outwardly beyond the planes of the opposite faces of the disk 50, preferably so the teeth are successively offset first in one axial direction and then in another. The furrow cut by the wheel is substantially equal to the maximum displacement of the teeth in both directions.

In an operating embodiment, disk 50 is fashioned from steel plate 0.25-inch thick and has a tip-to-tip diameter of approximately 12 inches. The angle α is preferably about 40°. Each tip 58 extends radially outwardly about 1.3-inches beyond the shallowest portion of gullet 56. The radius of curvature of each gullet 56 is about 1.5-inches and that of each rounded tip portion 58 is about 0.4-inch. Eight teeth equally spaced 45° apart are used, with successive teeth offset about 0.2-inch beyond the planes of the opposite faces of the disk 50 to provide a furrow about 0.65-inch wide. The distances of bend locations from the center of the disk are about 5.2 inches and teeth 54 are hardfaced from the bend location 60 to the tip end. By using offset teeth, power requirements for cutting the furrow are reduced and more loose dirt is provided in the bottom of the cut furrow to provide better cover for seed. The cutter wheel with offset teeth is more economical to produce than at least some other types.

Because of the symmetry of the cutter wheel 12, shaft 34 is extendable through aperture 62 with either side of disk 50 facing outwardly. The wheel can be removed from the shaft 34 and turned around with the opposite side facing outwardly so what were formerly the trailing edges of teeth become the leading edges.

The wheel 21 is devoid of notches, hooks, steeply-sloped contours, and deep gullets, greatly reducing the problems of wrapping. There are no areas on the wheel to catch long grasses or foreign objects such as wires or strings.

In operation, the cutter wheels are driven by the tractor to rotate at a sufficiently high speed in contact with the ground to cut a furrow therein. Preferably the cutter wheels are rotated at a speed of about 630 rpm in the direction of travel of the apparatus. The wheel cuts a furrow about 0.65-inch in width having a depth of from ½ to 2½ inches.

I claim:

1. For a tillage apparatus having a driven shaft member, a cutter wheel having a plurality of teeth and adapted to be mounted on the apparatus for rotation with the shaft member for forming a furrow in the soil, the cutter wheel comprising:

a disk member having a smoothly contoured periphery, and defining a plurality of cutting tip members spaced about the periphery, each having a radially outwardly extending rounded tip portion with leading and trailing edges, the periphery also defining a plurality of shallow outwardly arcuate gullets spaced between the tip members, the arcuate gullets having a radius of curvature greater than the radius of curvature of the rounded tip portions, and a plurality of gently sloped sections each connecting an edge of a tip member with the adjacent gullet, and wherein each sloped section is at an angle of approximately 40° to a line extending radially from the center of the disk member through the tip portion of the adjacent tip member.

2. The invention defined in claim 1 wherein the leading and trailing edges are formed from a relatively hard material.

3. The invention defined in claim 1 wherein the leading and trailing edges are substantially identical so that the cutter wheel can be rotated in either direction to form a furrow.

4. The invention defined in claim 1 wherein the tip members are axially offset and extend outwardly beyond the sides of the disk member.

5. For a tillage implement having a drive shaft member, a cutter wheel adapted to be mounted on the implement and rotatably driven in either direction by the shaft member for cutting a furrow, comprising:

a disk-like body having a plurality of teeth spaced about its circumference, each having a rounded cutting tip portion with leading and trailing edges; a plurality of gently arched gullets spaced between the teeth, each having a radius of curvature greater than the radius of curvature of the cutting tip portion and connecting the leading edge of one tooth with the trailing edge of the preceding tooth, and wherein each tip portion extends radially outwardly beyond the bottom of the adjacent gullet by at least approximately one-tenth the diameter of the disk-like body and the leading and trailing edges of each tooth have substantially identical contours so that the cutting characteristics of the wheel are substantially the same when rotated in either direction.

6. The invention defined in claim 5 wherein the section of the gullet associated with the leading edge of each tooth is the mirror image of the section associated with the trailing edge of the preceding tooth.

7. The invention defined in claim 5 wherein tooth-to-tooth diameter of the disk member is about 12 inches, the gullets have a radius of curvature of about 1.5 inches, the teeth have a radius of curvature of about 0.4 inches, and the teeth extend radially outwardly about 1.3 inches beyond the shallowest portion of the gullet.

8. The invention defined in claim 7 wherein each tooth is offset by bending along a line generally perpendicular to the radius of the tooth, the line located approximately 5.2 inches from the center of the disk member.

9. The invention defined in claims 5, 7 or 8 wherein the teeth are spaced about the circumference approximately 45° apart.

* * * * *